United States Patent
Heijnen et al.

(10) Patent No.: US 11,930,332 B2
(45) Date of Patent: Mar. 12, 2024

(54) METHOD FOR RECOGNIZING AT LEAST ONE NATURALLY EMITTED SOUND PRODUCED BY A REAL-LIFE SOUND SOURCE IN AN ENVIRONMENT COMPRISING AT LEAST ONE ARTIFICIAL SOUND SOURCE, CORRESPONDING APPARATUS, COMPUTER PROGRAM PRODUCT AND COMPUTER-READABLE CARRIER MEDIUM

(71) Applicant: Thomson Licensing, Cesson-Sevigne (FR)

(72) Inventors: Henk Heijnen, Cesson-Sevigne (FR); Philippe Gilberton, Cesson-Sevigne (FR); Eric Gautier, Cesson-Sevigne (FR)

(73) Assignee: Thomson Licensing, Cesson-Sevigne (FR)

( * ) Notice: Subject to any disclaimer, the term of this patent is extended or adjusted under 35 U.S.C. 154(b) by 133 days.

(21) Appl. No.: 17/778,879

(22) PCT Filed: Nov. 4, 2020

(86) PCT No.: PCT/EP2020/080963
§ 371 (c)(1),
(2) Date: May 23, 2022

(87) PCT Pub. No.: WO2021/104818
PCT Pub. Date: Jun. 3, 2021

(65) Prior Publication Data
US 2022/0408184 A1 Dec. 22, 2022

(30) Foreign Application Priority Data
Nov. 27, 2019 (EP) ..................................... 19211908

(51) Int. Cl.
*H04R 3/00* (2006.01)
*H04R 1/40* (2006.01)

(52) U.S. Cl.
CPC ............. *H04R 3/005* (2013.01); *H04R 1/406* (2013.01)

(58) Field of Classification Search
None
See application file for complete search history.

(56) References Cited

U.S. PATENT DOCUMENTS

| 11,631,407 B2* | 4/2023 | Gordon | G10L 15/08 704/275 |
| 2013/0070928 A1* | 3/2013 | Ellis | H04R 25/30 381/56 |

(Continued)

FOREIGN PATENT DOCUMENTS

| EP | 3419021 A1 | 12/2018 |
| WO | 2017095559 A1 | 6/2017 |

OTHER PUBLICATIONS

Greenhall, Adam, et al. Cepstral Mean Based Speech Source Discrimination, IEEE ICASSP Mar. 14-29, 2010, pp. 4490-4493.

*Primary Examiner* — Paul W Huber
(74) *Attorney, Agent, or Firm* — Vincent Edward Duffy

(57) ABSTRACT

The disclosure relates to a method for recognizing at least one naturally emitted sound produced by a real-life sound source in an environment comprising at least one artificial sound source. The method is implemented by an audio recognition device, and it includes simultaneously obtaining a first audio signal from a first microphone located in the environment and a second audio signal from an audio acquisition device associated with the at least one artificial sound source; analyzing the first audio signal, delivering a first list of sound classes corresponding to sounds recognized in the first audio signal; analyzing the second audio (Continued)

Figure 1:
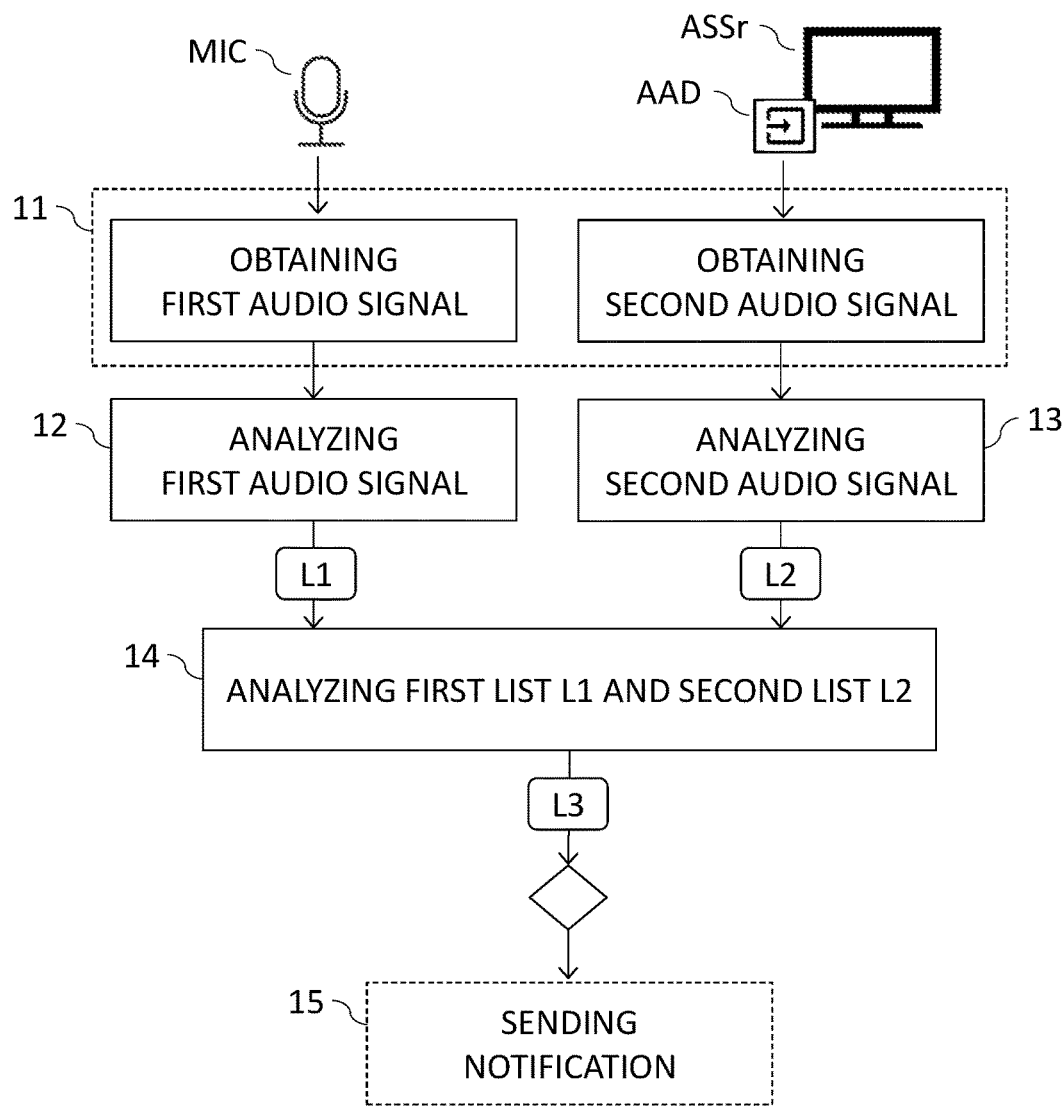

signal, delivering a second list of sound classes corresponding to sounds recognized in the second audio signal; and delivering a third list of sound classes, comprising only sound classes included in the first list of sound classes which are not included in the second list of sound classes.

14 Claims, 3 Drawing Sheets

(56) References Cited

U.S. PATENT DOCUMENTS

2016/0335488 A1   11/2016  Nongpiur et al.
2021/0134316 A1*  5/2021  Khoury .................. G10L 25/51

* cited by examiner

METHOD FOR RECOGNIZING AT LEAST ONE NATURALLY EMITTED SOUND PRODUCED BY A REAL-LIFE SOUND SOURCE IN AN ENVIRONMENT COMPRISING AT LEAST ONE ARTIFICIAL SOUND SOURCE, CORRESPONDING APPARATUS, COMPUTER PROGRAM PRODUCT AND COMPUTER-READABLE CARRIER MEDIUM

This application claims the benefit, under 35 U.S.C. § 365 of International Application PCT/EP2020/080963, filed Nov. 4, 2020, which was published in accordance with PCT Article 21(2) on Apr. 29, 2021, in English and which further claims the benefit of priority application EP19211908.9, filed on Nov. 27, 2019.

1. FIELD OF THE DISCLOSURE

The present disclosure relates generally to the field of audio recognition systems. More particularly, the present disclosure relates to a technique that allows discriminating artificial sounds produced by artificial sound sources (such as a television set, a radio receiver, etc.) against the same type of sound naturally produced by real-life sources.

2. BACKGROUND

The present section is intended to introduce the reader to various aspects of art, which may be related to various aspects of the present disclosure that are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

In the field of audio recognition, some audio recognition systems are specially designed to recognize sounds such as, for example, gunshots, baby's crying, glass breaking, etc. These systems—which are to be differentiated from automatic speech recognition systems since they are not designed to recognize speech but only sounds—may be used for a large variety of applications, for example but not limited to home security.

One of the problems these audio recognition systems are facing is the difficulty of discriminating artificially emitted sounds coming from loudspeakers of various electronic equipment (such as a TV set, a radio receiver, etc.) that may be present in the environment where these systems are implemented against naturally real-life emitted sounds. For example, in the field of home security systems, a user not at home should be notified if a gunshot sound or a glass breaking sound is detected in or around his home, but only if the detected sound is a "real-life" sound, i.e. if a gunshot was actually fired or a glass was actually broken. On the other hand, the user shouldn't be notified, for example, if the detected sound is part of the sound track of a movie broadcast on television and currently being watched by another family member. At the present time, many existing audio recognition systems are not very efficient when it comes to differentiate real-life sounds (i.e. naturally emitted sounds) versus apparatus-generated sound (i.e. artificially emitted sounds). In the field of home security, the resulting misclassification of sound events leads to the generation of a lot of "false positives" notified to the end user, who may ultimately lose confidence in such security systems.

In an attempt to address these drawbacks, some existing solutions rely on low level signal processing techniques to process audio signals captured by some microphones, with the aim of cancelling or at least reducing artificial sounds in the processed output audio signals. More particularly, subtractor circuitry is used for subtracting artificial sounds from a main audio signal captured by a microphone, and the resulting signal is processed by a sound recognition engine. The main issue with these solutions is that the microphones capture an unpredictable mix between real-life and artificial sounds, not only in term of amplitude but also in term of phase and potential echoes, due to the reflection of the sound on objects and/or structures present in the environment (such as, for example, walls). The sound captured by the microphones is thus a complex addition of reflected sounds and direct sounds. The amplitude and phase of all these sounds are unpredictable and make the subtraction very difficult to properly perform at the subtractor circuitry level. Consequently, such solutions require many parameter adjustments (for example, to set the gain adaptation coefficients of the subtractor circuitry) which are highly dependent on the environment (such as, for example, the room configuration, the location of the sound sources in the room, the sound power of the apparatus emitting some artificial sounds, the location and orientation of the microphones, etc.), and finally provide only poor or mixed results.

It would hence be desirable to provide a technique that would avoid at least some of these drawbacks of the prior art, and that would notably allow discriminating artificially emitted sounds against naturally emitted sounds in a more accurate way.

3. SUMMARY

According to the present disclosure, a method for recognizing at least one naturally emitted sound produced by a real-life sound source in an environment comprising at least one artificial sound source is disclosed. Such a method is implemented by an audio recognition device, and it includes:
  simultaneously obtaining:
    a first audio signal from a first microphone located in the environment; and
    a second audio signal from an audio acquisition device associated with the at least one artificial sound source;
  analyzing the first audio signal, delivering a first list of sound classes corresponding to sounds recognized in the first audio signal;
  analyzing the second audio signal, delivering a second list of sound classes corresponding to sounds recognized in the second audio signal;
  delivering a third list of sound classes, comprising only sound classes included in the first list of sound classes which are not included in the second list of sound classes.

According to an embodiment, the method further includes sending a notification to a communications terminal when the third list of sound classes is not empty.

According to an embodiment, analyzing the first audio signal includes computing a first probability distribution over a set of reference sound classes, wherein each reference sound class of the set of reference sound classes is associated with a score representing a probability of presence of a sound belonging to the reference sound class in the first audio signal.

According to a complementary feature of this embodiment, the first list of sound classes includes sound classes having an associated score greater than or equal to a first predetermined threshold, with respect to the first probability distribution.

According to an alternative complementary feature of this embodiment, the first list of sound classes includes a first predetermined number $n_1$ of sound classes, corresponding to the $n_1$ sound classes having the greatest score, with respect to the first probability distribution.

According to an embodiment, analyzing the second audio signal includes computing a second probability distribution over a set of reference sound classes, wherein each reference sound class of the set of reference sound classes is associated with a score representing a probability of presence of a sound belonging to the reference sound class in the second audio signal.

According to a complementary feature of this embodiment, the second list of sound classes includes sound classes having an associated score greater than or equal to a second predetermined threshold, with respect to the second probability distribution.

According to an alternative complementary feature of this embodiment, the second list of sound classes includes a second predetermined number $n_2$ of sound classes, corresponding to the $n_2$ sound classes having the greatest score, with respect to the second probability distribution.

According to an embodiment, the audio acquisition device is a second microphone located in the vicinity of the artificial sound source.

According to a complementary feature of this embodiment, the second microphone is a directional microphone directed towards the artificial sound source.

According to an alternative embodiment, the audio acquisition device is connected to an audio output of the artificial sound source, in an acoustical isolated way.

The present disclosure also concerns an audio recognition device for recognizing at least one naturally emitted sound produced by a real-life sound source in an environment comprising at least one artificial sound source. Such an audio recognition device includes:

a first sound recognition engine, implementing a first machine learning system configured for obtaining and analyzing a first audio signal provided by a first microphone located in the environment, and for delivering a first list of sound classes corresponding to sounds recognized in the first audio signal;

a second sound recognition engine, implementing a second machine learning system configured for obtaining and analyzing a second audio signal provided by an audio acquisition device associated with the at least one artificial sound source, and for delivering a second list of sound classes corresponding to sounds recognized in the second audio signal;

a decision taking module, configured for analyzing the first and second list of sound classes, and for delivering a third list of sound classes, the third list of sound classes comprising only sound classes included in the first list of sound classes which are not included in the second list of sound classes.

According to another aspect, the present disclosure also pertains to an audio recognition system for recognizing at least one naturally emitted sound produced by a real-life sound source in an environment comprising at least one artificial sound source, the audio recognition system comprising:

an audio recognition device as previously described;

at least one microphone, providing a first audio signal to the first recognition engine;

at least one audio acquisition device associated with the at least one artificial sound source, providing a second audio signal to the second recognition engine.

According to one implementation, the different steps of the method for recognizing at least one naturally emitted sound produced by a real-life sound source in an environment comprising at least one artificial sound source as described here above are implemented by one or more software programs or software module programs comprising software instructions intended for execution by at least one data processor of an audio recognition device.

Thus, another aspect of the present disclosure pertains to at least one computer program product downloadable from a communication network and/or recorded on a medium readable by a computer and/or executable by a processor, comprising program code instructions for implementing the method as described above. More particularly, this computer program product includes instructions to command the execution of the different steps of a method for recognizing at least one naturally emitted sound produced by a real-life sound source in an environment comprising at least one artificial sound source, as mentioned here above.

This program can use any programming language whatsoever and be in the form of source code, object code or intermediate code between source code and object code, such as in a partially compiled form or any other desirable form whatsoever.

According to one embodiment, the methods/apparatus may be implemented by means of software and/or hardware components. In this respect, the term "module" or "unit" can correspond in this document equally well to a software component and to a hardware component or to a set of hardware and software components.

A software component corresponds to one or more computer programs, one or more sub-programs of a program or more generally to any element of a program or a piece of software capable of implementing a function or a set of functions as described here below for the module concerned. Such a software component is executed by a data processor of a physical entity (terminal, server, etc.) and is capable of accessing hardware resources of this physical entity (memories, recording media, communications buses, input/output electronic boards, user interfaces, etc.).

In the same way, a hardware component corresponds to any element of a hardware unit capable of implementing a function or a set of functions as described here below for the module concerned. It can be a programmable hardware component or a component with an integrated processor for the execution of software, for example an integrated circuit, a smartcard, a memory card, an electronic board for the execution of firmware, etc.

In addition, the present disclosure also concerns a non-transitory computer-readable medium comprising a computer program product recorded thereon and capable of being run by a processor, including program code instructions for implementing the method for recognizing at least one naturally emitted sound produced by a real-life sound source in an environment comprising at least one artificial sound source as described above.

The computer readable storage medium as used herein is considered a non-transitory storage medium given the inherent capability to store the information therein as well as the inherent capability to provide retrieval of the information therefrom. A computer readable storage medium can be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present principles can be applied, is merely an illustrative and not exhaustive listing as is readily appreciated by one of ordinary skill in the art: a portable computer diskette, a hard disk, a read-only memory (ROM), an erasable programmable read-only memory (EPROM or Flash memory), a portable compact disc read-only memory (CD-ROM), an optical storage device, a magnetic storage device, or any suitable combination of the foregoing.

It is to be understood that both the foregoing general description and the following detailed description are exemplary and explanatory and are not restrictive of the disclosure, as claimed.

It must also be understood that references in the specification to "one embodiment" or "an embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

4. BRIEF DESCRIPTION OF THE DRAWINGS

Figure 2:
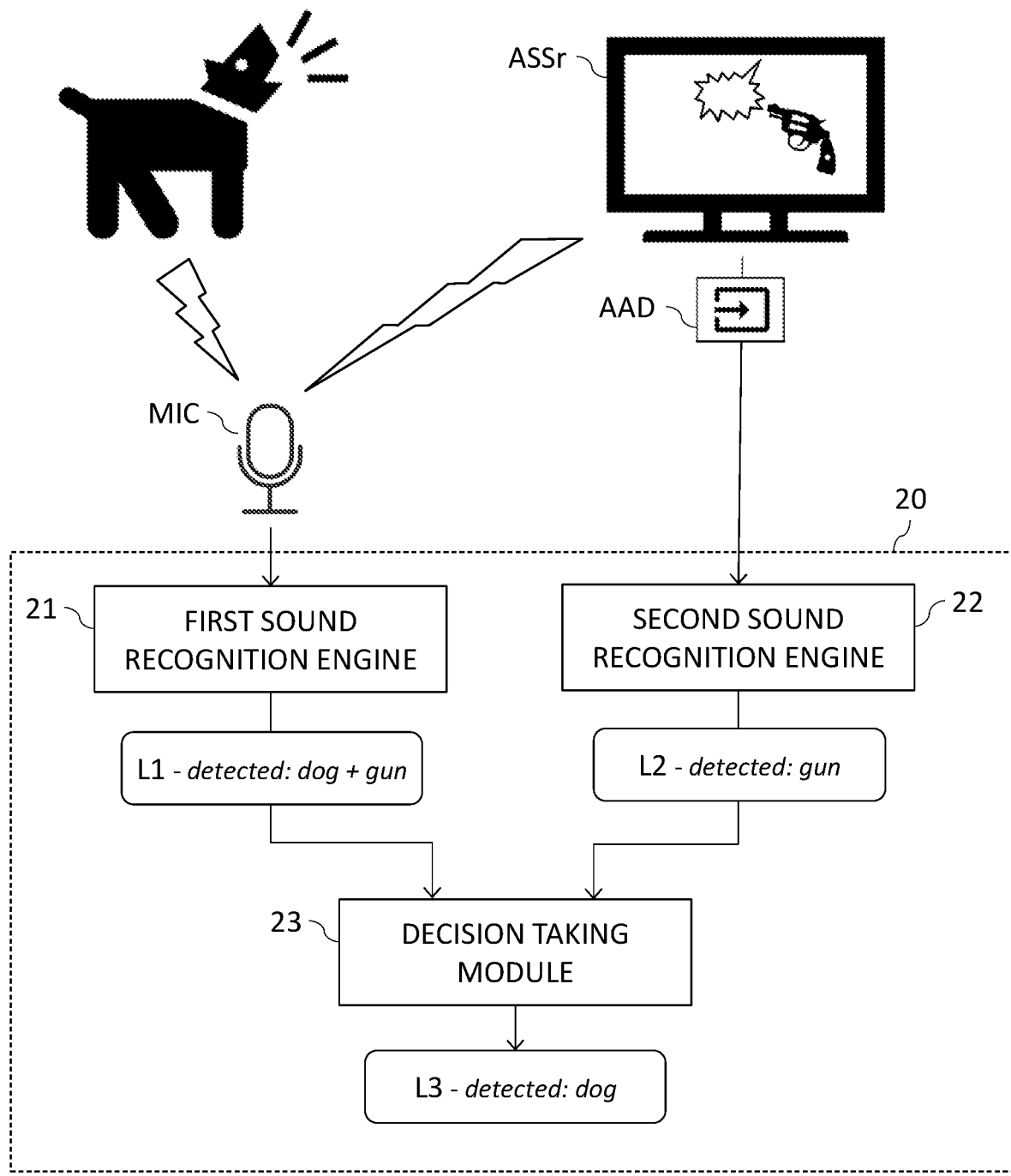
Figure 3:
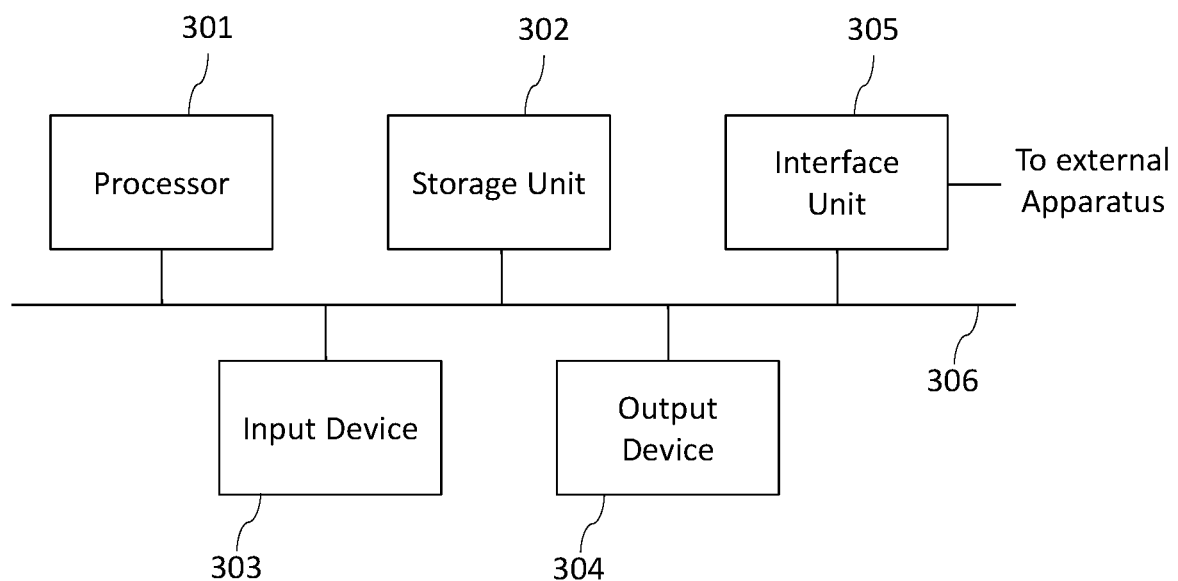

Embodiments of the present disclosure can be better understood with reference to the following description and drawings, given by way of example and not limiting the scope of protection, and in which:

FIG. 1 is a flow chart for illustrating the general principle of the proposed technique for recognizing at least one naturally emitted sound produced by a real-life sound source in an environment comprising at least one artificial sound source, according to an embodiment of the present disclosure;

FIG. 2 is a schematic diagram showing the main components of an audio recognition device according to an embodiment of the present disclosure, and an example of how these components are used to differentiate naturally emitted sound versus artificially emitted sounds; and FIG. 3 is a schematic block diagram illustrating an example of an audio recognition device for recognizing at least one naturally emitted sound produced by a real-life sound source in an environment comprising at least one artificial sound source, according to an embodiment of the present disclosure.

The components in the figures are not necessarily to scale, emphasis instead being placed upon illustrating the principles of the disclosure.

5. DETAILED DESCRIPTION

The present disclosure relates to a method that allows recognizing at least one naturally emitted sound produced by a real-life sound source in an environment comprising at least one artificial sound source, the artificial sound source being likely to produce the same type of sounds as the real-life sound source. In other words, the proposed technique makes it possible to discriminate artificially emitted sounds against naturally emitted sounds in a more accurate way than current existing systems. By "artificially emitted sounds", it is understood in the context of the disclosure sounds that are produced by an electronic apparatus (for example a television set, a radio receiver, a smartphone, a tablet, etc.) and emitted by one or more loudspeakers. In contrast, "naturally emitted sounds" are not emitted via a loudspeaker of an electronic apparatus, but correspond to "real-life" sounds. The same type of sound may be artificially emitted or naturally emitted. For example, a dog barking sound belongs to the category of "naturally emitted sounds" if it is produced by a real flesh and blood dog, but it belongs to the category of "artificially emitted sounds" if it is part of the soundtrack of a movie broadcast on a TV set and showing a dog barking.

As it will be described more fully hereafter with reference to the accompanying figures, it is proposed in one embodiment of the present disclosure to use a combination of two recognition engines for discriminating a sound event originating from an artificial sound source from the same type of sound event that may originate from live or "real-life" sound source. Rather than carrying out the discrimination at the signal level, by using low-level signal processing technique at a subtractor circuitry in an attempt to cancel artificial emitted sound against naturally emitted sound in a main audio signal before sounds are recognized, it is proposed in the present disclosure to perform the discrimination at a higher and symbolic level, after the sounds are recognized.

This disclosure may, however, be embodied in many alternate forms and should not be construed as limited to the embodiments set forth herein. Accordingly, while the disclosure is susceptible to various modifications and alternative forms, specific embodiments thereof are shown by way of example in the drawings and will herein be described in detail. It should be understood, however, that there is no intent to limit the disclosure to the particular forms disclosed, but on the contrary, the disclosure is to cover all modifications, equivalents, and alternatives falling within the scope of the disclosure as defined by the claims. In the drawings, like or similar elements are designated with identical reference signs throughout the several views thereof.

While not explicitly described, the present embodiments and variants may be employed in any combination or sub-combination.

FIG. 1 is a flow chart for describing a method for recognizing at least one naturally emitted sound produced by a real-life sound source in an environment including at least one artificial sound source, according to an embodiment of the present disclosure. The method is implemented by an audio recognition device, which is further detailed in one embodiment later in this document, and which includes at least one processor adapted and configured for carrying out the steps described hereafter.

At step 11, the audio recognition device simultaneously obtains a first audio signal and a second audio signal. By simultaneously obtained, it is meant here that the first and the second audio signal are acquired at about the same moment, i.e. they correspond to the recording or the capture of some sounds emitted during a similar timeframe.

The first audio signal is obtained from a first microphone MIC located in the environment. This first microphone is intended to capture both artificial and naturally emitted sounds. According to a particular feature, the first microphone MIC is an omnidirectional microphone, thus able to pick up sounds from all directions equally well and with a good sensitivity.

The second audio signal is obtained from an audio acquisition device AAD associated with at least one artificial sound source ASSr located in the environment. By "associated with", it is meant here that the audio acquisition device is designed and/or located and/or oriented so as to capture in a privileged way (i.e. only, or at least mainly) sounds emitted by the artificial sound source to which it is associated with.

In an embodiment, the audio acquisition device AAD may take the form of a second microphone located in the vicinity of the artificial sound source. For example, such a second microphone may be placed within fifty centimeters of a loudspeaker of the artificial sound source. According to a particular feature, the second microphone may be a directional microphone designed to be more sensitive in one direction, and directed so as to accurately acquire sounds coming from the artificial sound source. Sounds coming from other directions, i.e. from other sources than the artificial sound source to which the second microphone is associated, are thus not captured or only poorly captured by the second microphone. According to another embodiment, the audio acquisition device AAD may take the form of a sound acquisition interface (e.g. a sound acquisition card) embedded into the audio recognition device, and an audio output of the artificial sound source ASSr may then be directly connected to an input of the sound acquisition interface. The connection may be of any connection type—wired or wireless—allowing to transmit an audio signal (such as, for example, connection via High Definition Multimedia Interface HDMI cable, TOSLINK optical audio cable, RCA connectors, Bluetooth, etc.). In that way, the audio acquisition device is connected to the artificial sound source in an acoustical isolated way such that the only sounds acquired by the audio acquisition device are those coming from the artificial sound source(s) to which it is connected.

At step 12, the first audio signal is analyzed, to deliver a first list L1 of sound classes corresponding to sounds recognized in the first audio signal.

In one embodiment, analyzing the first audio signal includes computing a first probability distribution over a set of reference sound classes, wherein each reference sound class of the set of reference sound classes is associated with a score representing a probability of presence of a sound belonging to the reference sound class in the first audio signal. For example, a set of reference sound classes may comprise the following sound classes: dog barking, baby's crying, screaming, glass breaking, slamming door, gunshot. As a result of the analysis of the first audio signal, an example of a first probability distribution computed may be: screaming—44%, baby's crying—40%, dog barking—7%, glass breaking—4%, slamming door—3%, gunshot—2%. The computed first probability distribution may then be used to build the first list L1 of sound classes delivered at step 12. According to a particular feature, the first list L1 of sound classes includes sound classes having an associated score greater than or equal to a first predetermined threshold, with respect to the first probability distribution. For example, among the set of reference sound classes, only sound classes having an associated score greater than or equal to 40% may be included in the first list of sound classes L1. Referring back to the previous example of first probability distribution, the first list L1 would then contains two sound classes: screaming sound class and baby's crying sound class. According to alternative particular feature, the first list L1 of sound classes includes a first predetermined number $n_1$ of sound classes, corresponding to the $n_1$ sound classes having the greatest scores, with respect to the first probability distribution. For example, among the set of reference sound classes, only the sound class having the greatest score may be included in the first list of sound classes ($n_1=1$). Referring back to the previous illustrative example of a first probability distribution, the first list L1 would then contains only one sound class, i.e. the screaming sound class.

At step 13, the second audio signal is analyzed, to deliver a second list L2 of sound classes corresponding to sounds recognized in the second audio signal.

Similar techniques and/or embodiments than those previously described in relation with step 12 may be implemented for analyzing the second audio signal. Thus, In one embodiment, analyzing the second audio signal includes computing a second probability distribution over a set of reference sound classes, wherein each reference sound class of the set of reference sound classes is associated with a score representing a probability of presence of a sound belonging to the reference sound class in the second audio signal. The set of reference sound classes is the same one than the one used in step 12 (or at least it includes common elements). The second computed probability distribution may then be used to build the second list L2 of sound classes delivered at step 13. According to a particular feature, in a similar way than the one previously described in relation with step 12, the second list L2 of sound classes includes sound classes having an associated score greater than or equal to a second predetermined threshold, with respect to the second probability distribution. According to an alternative particular feature, the second list L2 of sound classes includes a second predetermined number $n_2$ of sound classes, corresponding to the $n_2$ sound classes having the greatest scores, with respect to the second probability distribution.

The first list L1 of sound classes and the second list L2 of sound classes may be built using a same technique, i.e. both are built by keeping sound classes greater than or equal to some predetermined thresholds, or both are built by keeping some predetermined numbers of sound classes having the greatest scores. In that case, depending on the technique used, the second predetermined threshold may have the same value as the first predetermined threshold, or the second predetermined number $n_2$ of sound classes may have the same value as the first predetermined number $n_1$ of sound classes. However, according to another feature, the second predetermined threshold may have a different value than the first predetermined threshold, or the second predetermined number $n_2$ of sound classes may have a different value than the first predetermined number $n_1$ of sound classes. Indeed, because the second audio signal may be captured in an acoustical isolated way in some embodiment, it could be considered as less noisy than the first audio signal, which can justify using different values of threshold or predetermined numbers of sound classes to compute the first list L1 of sound classes and the second list L2 of sound classes from their respective first and second probability distributions.

In another embodiment, the first list L1 of sound classes and the second list L2 of sound classes may be built using different techniques, i.e. one is built by keeping sound classes greater than or equal to a predetermined threshold, and the other is built by keeping a predetermined number of sound classes having the greatest scores.

At step 14, the first list L1 of sound classes and the second list L2 of sound classes are analyzed, and a third list of sound classes L3 is built from the first list L1 and the second list L2. More particularly, the first list L1 and the second list L2 are compared, so as to deliver a third list of sound classes L3, comprising only sound classes included in the first list of sound classes L1 which are not included in the second list of sound classes L2. In other words, the sound classes corresponding to artificially emitted sound detected in the second audio signal are removed from the list of sound classes corresponding to sound detected in the first audio signal. In that way, the third list of sound classes L3 corresponds to a filtered list of sound classes comprising only sound classes corresponding to naturally emitted sound. For example, if the first list of sound classes L1 includes two sound classes "dog barking" and "baby's crying", and if the second list of sound classes L2 includes only one sound class "dog barking", the generated third list of sound classes L3 will comprise only one sound class "baby's crying". The proposed technique thus offers a solution to discriminate artificially emitted sounds against naturally emitted sounds, the solution being totally independent of the location of the sound sources in the room and not requiring any parameters adjustment.

According to one embodiment, an optional step 15 may be carried out, comprising sending a notification to at least one communication terminal when the third list L3 of sound classes is not empty. The communication terminal may be, for example, a smartphone or a tablet. Such a notification can take, for example, the form of an email, a short message text (SMS), a push notification, or other forms, and it may be useful notably in (but not limited to) the field of home security, when a user may be interested in being notified of abnormal sound events (identified in the set of reference sound classes) occurring in or near his house when he is not at home.

According to another aspect, and as schematically illustrated in relation with FIG. 2 in one embodiment, the present disclosure also pertains to an audio recognition device for recognizing at least one naturally emitted sound produced by a real-life sound source in an environment including at least one artificial sound source. Such an audio recognition device 20 includes a first sound recognition engine 21, a second sound recognition engine 22, and a decision taking module 23. As an implementation exemplary the first sound recognition engine 21, the second sound recognition engine 22, and the decision taking module 23 may be integrated in a standalone audio recognition device which is equipped of a direct connection to a set-top box itself connected through a HDMI port to a television set, so as to obtain the sound track of the current TV program displayed on the television set.

The first sound recognition engine 21 and the second sound recognition engine 22 may each implement a machine learning system configured for obtaining and analyzing an audio signal. More particularly, according to an embodiment, the machine learning system of the first sound recognition engine 21 and the machine learning system of the second sound recognition engine 22 are classifiers trained to classify sounds respectively detected in the first audio signal and in the second audio signal, with respect to sound classes of a set of reference sound classes. Those classifiers may rely on various types of classification algorithms (Naïve Bayes, Nearest Neighbor, Artificial Neural Networks, decision tree, etc.). In one embodiment, only one machine learning system may be used to process both the first audio signal and the second audio signal, In that case, the first and the second audio signals are simultaneously obtained, but they are processed one after the other by a same machine learning classifier. By comparing the results of the classification processes, i.e. the first list of sound classes L1 and the second list of sound classes L2, the decision taking module 23 is then able to make the decision of signaling only the naturally emitted sounds to the user (for example, in the form of the third list of sound classes L3).

The audio recognition device 20 may be part of an audio recognition system further including at least one microphone, for providing the first audio signal to the first recognition engine, and at least one audio acquisition device associated with the at least one artificial sound source, for providing the second audio signal to the second recognition engine. According to an embodiment, the microphone and/or the audio acquisition device may be embedded in the audio recognition device 20.

FIG. 3 shows a schematic block diagram illustrating an example of an audio recognition device 300 for recognizing at least one naturally emitted sound produced by a real-life sound source in an environment including at least one artificial sound source, according to an embodiment of the present disclosure. In an embodiment, such a device 300 may be a standalone device that can be connected to at least one artificial sound source (including sources that don't necessary include loudspeakers, but that are able to produce an audio signal on an audio output jack) such as, for example, a television set, a radio receiver or a set-top box.

The device 300 includes a processor 301, a storage unit 302, an input device 303, an output device 304, and an interface unit 305 which are connected by a bus 306. Of course, constituent elements of the device 300 may be connected by a connection other than a bus connection using the bus 306.

The processor 301 controls operations of the audio recognition device 300. The storage unit 302 stores at least one program to be executed by the processor 301, and various data, including for example parameters used by computations performed by the processor 301, intermediate data of computations performed by the processor 301 such as the lists of sound classes respectively produced by a first and a second sound recognition engines embedded within the device 300, and so on. The processor 301 is formed by any known and suitable hardware, or software, or a combination of hardware and software. For example, the processor 301 is formed by dedicated hardware such as a processing circuit, or by a programmable processing unit such as a CPU (Central Processing Unit) that executes a program stored in a memory thereof.

The storage unit 302 is formed by any suitable storage or means capable of storing the program, data, or the like in a computer-readable manner. Examples of the storage unit 302 include non-transitory computer-readable storage media such as semiconductor memory devices, and magnetic, optical, or magneto-optical recording media loaded into a read and write unit. The program causes the processor 301 to perform a method for recognizing at least one naturally emitted sound produced by a real-life sound source in an environment comprising at least one artificial sound source as a function of input data according to an embodiment of the present disclosure as described previously. More particularly, the program causes the processor 301 to compute, from a first audio signal and a second audio signal, intermediate lists of sound classes to provide to a decision taking module, so that the recognition of at least one naturally-emitted sound may be performed.

The input device 303 is formed for example by a microphone.

The output device 304 is formed for example by a processing unit configured to take decision as a function of recognized sounds within the first and second audio signal.

The interface unit 305 provides an interface between the audio recognition device 300 and an external apparatus. The interface unit 305 is typically a sound acquisition interface, which may be communicable with the external apparatus via cable or wireless communication. For example, the external apparatus may be a set-top box or a television set.

Although only one processor 301 is shown on FIG. 3, it must be understood that such a processor may comprise different modules and units embodying the functions carried out by device 300 according to embodiments of the present disclosure, such as the unit previously described in relation with FIG. 2:

- a first sound recognition engine, implementing a first machine learning system configured for obtaining and analyzing a first audio signal provided by a first microphone located in the audio recognition device environment, and for delivering a first list of sound classes corresponding to sounds recognized in the first audio signal;
- a second sound recognition engine, implementing a second machine learning system configured for obtaining and analyzing a second audio signal provided by an audio acquisition device associated with at least one artificial sound source located in the audio recognition device environment, and for delivering a second list of sound classes corresponding to sounds recognized in the second audio signal;
- a decision taking module, configured for delivering a third list of sound classes comprising only sound classes included in the first list of sound classes which are not included in the second list of sound classes.

These modules and units may also be embodied in several processors 301 communicating and co-operating with each other.

While the present disclosure has been described with reference to exemplary embodiments, it is to be understood that the present disclosure can be embodied in various forms, and is not to be limited to the examples discussed above. More particularly, the environment where the audio recognition device is implemented may comprise more than one artificial sound sources. A plurality of audio acquisition devices and/or an audio acquisition device having a plurality of audio inputs may then be used and associated with the various artificial sound sources, so that audio signals generated by each artificial sound source may be obtained and analysed. In an embodiment, the proposed technique is thus not limited to obtaining and analysing two audio signals, i.e. a mixed first audio signal comprising both naturally and artificially emitted sounds and a second audio signal comprising only artificially emitted sounds. In particular, a plurality of audio signals comprising artificially emitted sounds may be processed by one or more machine learning systems so as to ensure that any artificial sound source present in the environment is taken into account when it comes to discriminate naturally emitted sounds against artificially emitted sounds.

The invention claimed is:

1. A method for recognizing at least one naturally emitted sound produced by a real-life sound source in an environment comprising at least one artificial sound source (ASSr), the method being implemented by an audio recognition device, wherein the method comprises:
    simultaneously obtaining:
        a first audio signal from a first microphone (MIC) located in the environment; and
        a second audio signal from an audio acquisition device (AAD) associated with the at least one artificial sound source;
    analyzing the first audio signal and delivering a first list of sound classes (L1) corresponding to sounds recognized in the first audio signal;
    analyzing the second audio signal and delivering a second list of sound classes (L2) corresponding to sounds recognized in the second audio signal;
    delivering a third list of sound classes (L3), comprising only sound classes included in the first list of sound classes (L1) which are not included in the second list of sound classes (L2).

2. The method according to claim 1, wherein the method further comprises sending a notification to a communications terminal when the third list of sound classes (L3) is not empty.

3. The method according to claim 1, wherein analyzing the first audio signal comprises computing a first probability distribution over a set of reference sound classes, wherein each reference sound class of the set of reference sound classes is associated with a score representing a probability of presence of a sound belonging to the reference sound class in the first audio signal.

4. The method according to claim 3, wherein the first list of sound classes comprises sound classes having an associated score greater than or equal to a first predetermined threshold, with respect to the first probability distribution.

5. The method according to claim 3, wherein the first list of sound classes comprises a first predetermined number $n_1$ of sound classes, corresponding to the $n_1$ sound classes having the greatest score, with respect to the first probability distribution.

6. The method according to claim 1, wherein analyzing the second audio signal comprises computing a second probability distribution over a set of reference sound classes, wherein each reference sound class of the set of reference sound classes is associated with a score representing a probability of presence of a sound belonging to the reference sound class in the second audio signal.

7. The method according to claim 6, wherein the second list of sound classes comprises sound classes having an associated score greater than or equal to a second predetermined threshold, with respect to the second probability distribution.

8. The method according to claim 6, wherein the second list of sound classes comprises a second predetermined number $n_2$ of sound classes, corresponding to the $n_2$ sound classes having the greatest score, with respect to the second probability distribution.

9. The method according to claim 1, wherein the audio acquisition device (AAD) is a second microphone located in the vicinity of the artificial sound source (ASSr).

10. The method according to claim 9, wherein the second microphone is a directional microphone directed towards the artificial sound source.

11. The method according to claim 1, wherein the audio acquisition device (AAD) is connected to an audio output of the artificial sound source (ASSr) in an acoustical isolated way.

12. An audio recognition device-MI for recognizing at least one naturally emitted sound produced by a real-life sound source in an environment comprising at least one artificial sound source (ASSr), wherein the audio recognition device (20) comprises:
    a first sound recognition engine, implementing a first machine learning system configured for obtaining and analyzing a first audio signal provided by a first microphone located in the environment, and for delivering a first list of sound classes (L1) corresponding to sounds recognized in the first audio signal;

a second sound recognition engine, implementing a second machine learning system configured for obtaining and analyzing a second audio signal provided by an audio acquisition device associated with the at least one artificial sound source, and for delivering a second list of sound classes (L2) corresponding to sounds recognized in the second audio signal;

a decision taking module, configured for delivering a third list of sound classes (L3), the third list of sound classes comprising only sound classes included in the first list of sound classes (L1) which are not included in the second list of sound classes (L2).

13. An audio recognition system for recognizing at least one naturally emitted sound produced by a real-life sound source in an environment comprising at least one artificial sound source, wherein the audio recognition system comprises:

an audio recognition device, the audio recognition device comprising:

a first sound recognition engine, implementing a first machine learning system configured for obtaining and analyzing a first audio signal provided by a first microphone located in the environment, and for delivering a first list of sound classes (L1) corresponding to sounds recognized in the first audio signal;

a second sound recognition engine, implementing a second machine learning system configured for obtaining and analyzing a second audio signal provided by an audio acquisition device associated with the at least one artificial sound source, and for delivering a second list of sound classes (L2) corresponding to sounds recognized in the second audio signal; and a decision taking module, configured for delivering a third list of sound classes (L3), the third list of sound classes comprising only sound classes included in the first list of sound classes (L1) which are not included in the second list of sound classes (L2);

at least one microphone (MIC), providing a first audio signal to the first recognition engine in the audio recognition device;

at least one audio acquisition device (ADD) associated with the at least one artificial sound source (ASSr), providing a second audio signal to the second recognition engine in the audio recognition device.

14. A non-transitory computer-readable medium comprising a computer program product recorded thereon and capable of being run by a processor, including program code instructions for implementing a method comprising:

simultaneously obtaining:

a first audio signal from a first microphone (MIC) located in the environment; and a second audio signal from an audio acquisition device (AAD) associated with the at least one artificial sound source;

analyzing the first audio signal and delivering a first list of sound classes (L1) corresponding to sounds recognized in the first audio signal;

analyzing the second audio signal and delivering a second list of sound classes (L2) corresponding to sounds recognized in the second audio signal;

delivering a third list of sound classes (L3), comprising only sound classes included in the first list of sound classes (L1) which are not included in the second list of sound classes (L2).

* * * * *